US010730616B2

(12) United States Patent
Halcom

(10) Patent No.: US 10,730,616 B2
(45) Date of Patent: Aug. 4, 2020

(54) CONNECTOR ASSEMBLY FOR ROTOR HEAD SWASHPLATE

(71) Applicant: Sikorsky Aircraft Corporation, Stratford, CT (US)

(72) Inventor: Lance Halcom, Coppell, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/564,147

(22) PCT Filed: Mar. 29, 2016

(86) PCT No.: PCT/US2016/024620
§ 371 (c)(1),
(2) Date: Oct. 3, 2017

(87) PCT Pub. No.: WO2016/171849
PCT Pub. Date: Oct. 27, 2016

(65) Prior Publication Data
US 2018/0079498 A1 Mar. 22, 2018

Related U.S. Application Data

(60) Provisional application No. 62/151,472, filed on Apr. 23, 2015.

(51) Int. Cl.
*B64C 27/605* (2006.01)
*B64C 27/10* (2006.01)

(52) U.S. Cl.
CPC ............ *B64C 27/605* (2013.01); *B64C 27/10* (2013.01)

(58) Field of Classification Search
CPC .............................. B64C 27/605; B64C 27/10
See application file for complete search history.

(56) References Cited

U.S. PATENT DOCUMENTS 3,841,586 A * 10/1974 Broadley .............. B64C 27/605 244/17.25
4,688,993 A * 8/1987 Ferris .................... B64C 27/605 416/114
6,280,141 B1 * 8/2001 Rampal ................. B64C 27/605 416/114

(Continued)

FOREIGN PATENT DOCUMENTS

EP 2740663 A1 6/2014
WO 2015017101 A1 2/2015

OTHER PUBLICATIONS

PCT ISR Written Opinion; International Application No. PCT/US 16/24620; International Filing Date: Mar. 29, 2016; dated Sep. 16, 2016, pp. 1-8.

(Continued)

*Primary Examiner* — Sizo B Vilakazi
(74) *Attorney, Agent, or Firm* — Cantor Colburn LLP

(57) ABSTRACT

A connector assembly to connect a swashplate and a rotor shaft or hub is provided. The connector assembly includes a mount configured to fixedly connect to the rotor shaft or hub, a sleeve pivotably attached to the mount, and a translating element translationally retained within the sleeve and configured to engage with the swashplate such that the swashplate and the rotor shaft or hub rotate at the same rotational speed.

17 Claims, 5 Drawing Sheets

(56) References Cited

U.S. PATENT DOCUMENTS

| | | | | |
|---|---|---|---|---|
| 8,303,248 | B2 * | 11/2012 | Cabrera | B64C 27/605 415/104 |
| 8,840,372 | B2 * | 9/2014 | Girard | B64C 27/605 416/114 |
| 2014/0093374 | A1 * | 4/2014 | Puricelli | B64C 27/32 416/113 |
| 2014/0154074 | A1 * | 6/2014 | Zientek | B64C 27/605 416/1 |

OTHER PUBLICATIONS

PCT Notification of Transmittal of the International Search Report; International Application No. PCT/US 16/24620; International Filing Date: Mar. 29, 2016; dated Sep. 16, 2016, pp. 1-20.

Extended European Search Report for European Application No. 16783557.8; Date of Completion: Oct. 11, 2018; dated Oct. 24, 2018; 7 Pages.

* cited by examiner

CONNECTOR ASSEMBLY FOR ROTOR HEAD SWASHPLATE

CROSS REFERENCE TO RELATED APPLICATIONS

This application is a National Stage application of PCT/US2016/024620, filed Mar. 29, 2016, which claims the benefit of U.S. Provisional Application No. 62/151,472, filed Apr. 23, 2015, both of which are incorporated by reference in their entirety herein.

BACKGROUND OF THE INVENTION

The subject matter disclosed herein generally relates to rotor control systems and, more particularly, to connector assemblies for rotor head swashplates.

Control of a rotary-wing aircraft, such as a vertical takeoff and landing (VTOL) aircraft or helicopter, is affected through cyclic and collective pitch control. Blade pitch control of a rotary-wing aircraft main rotor system is typically achieved through a swashplate assembly which transfers the motion of non-rotating control members within a stationary field to the rotating members within a rotational field.

The swashplate assembly generally includes two rings connected by a series of bearings with one swashplate ring connected to the airframe/gearbox (stationary field), and the other swashplate ring connected to a rotor hub (rotational field). Apart from rotary motion, the rotationally stationary swashplate ring and the rotational swashplate ring otherwise move as a unitary component.

Swashplate assemblies may be employed with or on helicopter rotor heads as a means of controlling blade pitch via an aircraft's fixed controls. The swashplates may typically include a rotating element or field that is directly linked to the blades in the rotor head and a stationary or fixed element or field that does not rotate. The rotating element of the swashplate may be connected to the blades by one or more pitch control rods or links. The rotor head may thus rotate the rotating element of the swashplate by pulling or forcing the connected rotating element to rotate through these pitch control rods or links. However, such configuration may result in dynamic instability within the system.

Thus, connector assemblies have been employed to drive the rotating element of the swashplate, thereby reducing the possibility of dynamic instability. Traditional connector assemblies may include hinge-like or scissor mechanisms. A pair of jointed connector assemblies may be included in the system. One of the connector assemblies may be configured to prevent the stationary or fixed element from rotating with the rotating element. Another connector assembly may be configured to connect the rotating element of the swashplate to a rotating shaft or head of a rotor. In this way, the rotating element of the swashplate will rotate at the same angular speed as the blades, which are also connected to the rotating shaft or head of the rotor, and are driven thereby.

The connector assemblies enable the swashplate assembly to be slid along the rotor shaft, thus enabling changes in position and orientation, while maintaining a mechanical connection between the rotating elements of the aircraft and the rotating element of the swashplate. Changes in position and orientation of the swashplate impacts the pitch of the blades of an aircraft thus enabling flight control.

BRIEF DESCRIPTION OF THE INVENTION

According to one embodiment a connector assembly to connect a swashplate and a rotor shaft or hub is provided. The connector assembly includes a mount configured to fixedly connect to the rotor shaft or hub, a sleeve pivotably attached to the mount, and a translating element translationally retained within the sleeve and configured to engage with the swashplate such that the swashplate and the rotor shaft or hub rotate at the same rotational speed.

In addition to one or more of the features described above, or as an alternative, further embodiments may include a pivot to pivotably attach the sleeve to the mount.

In addition to one or more of the features described above, or as an alternative, further embodiments may include a configuration wherein the pivot is integrally formed with the sleeve.

In addition to one or more of the features described above, or as an alternative, further embodiments may include a configuration wherein the translating element incorporates a bearing interface configured to rotationally engage with the swashplate.

In addition to one or more of the features described above, or as an alternative, further embodiments may include a configuration wherein the mount is configured to be driven at the rotational speed by the rotor shaft or hub, and wherein the translating element is configured to drive the rotary element of the swashplate at the rotational speed.

In addition to one or more of the features described above, or as an alternative, further embodiments may include a configuration wherein the mount comprises at least two components.

In addition to one or more of the features described above, or as an alternative, further embodiments may include a configuration wherein the rotor shaft or hub is a component within a rotary-wing aircraft.

According to another embodiment, a swashplate assembly for use with a rotor shaft or hub is provided. The assembly includes a rotary element, a stationary element operationally connected to the rotary element, and a connector assembly configured to operationally connect the rotary element to the rotor shaft or hub. The connector assembly includes a mount configured to fixedly connect to the rotor shaft or hub, a sleeve pivotably attached to the mount, and a translating element translationally retained within the sleeve and configured to engage with the rotary element such that the rotary element and the rotor shaft or hub rotate at the same rotational speed.

In addition to one or more of the features described above, or as an alternative, further embodiments may include a pivot to pivotably attach the sleeve to the mount.

In addition to one or more of the features described above, or as an alternative, further embodiments may include a configuration wherein the pivot is integrally formed with the sleeve.

In addition to one or more of the features described above, or as an alternative, further embodiments may include a configuration wherein the translating element incorporates a bearing interface configured to rotationally engage with the rotary element.

In addition to one or more of the features described above, or as an alternative, further embodiments may include a configuration wherein the mount is configured to be driven at the rotational speed by the rotor shaft or hub, and wherein the translating element is configured to drive the rotary element at the rotational speed.

In addition to one or more of the features described above, or as an alternative, further embodiments may include a configuration wherein the mount comprises at least two components.

In addition to one or more of the features described above, or as an alternative, further embodiments may include a configuration wherein the rotor shaft or hub is a component within a rotary-wing aircraft.

In addition to one or more of the features described above, or as an alternative, further embodiments may include one or more control rods connected to the rotary element and configured to adjust a pitch of a blade.

Technical effects of embodiments of the invention include providing a reduced weight and smaller volume connection between a rotating element of a swashplate assembly and a rotating hub. Further technical effects include replacing a scissor assembly with a translating connector assembly. Further technical effects include increased bearing life of a connector assembly.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Embodiments of the invention enable the removal of a traditional scissor assembly and replace it with a translating connector assembly, as described herein. Although described herein with respect to specific embodiments, and particularly with respect to rotary-wing aircraft, those of skill in the art will appreciate that embodiments of the invention are not limited thereto. For example, connector assemblies as described herein may be employed with or in any powered, rotating equipment, including, but not limited to, aircraft applications, down-hole drilling applications, engine/turbine control mechanisms, automobile transmission systems, etc. However, as noted, the descriptions provided herein are directed to a specific application in rotary-wing aircraft.

In accordance with aspects of the invention, traditional scissor links are replaced by translating connector assemblies that are installed into a rotor control system for a helicopter having a dual, coaxial rotor configuration but usage of the invention is of course not limited to only that type of configuration. As described below, the translating connector assemblies interface with a rotor head as well as the rotating swashplate. In this way, embodiments of the connector assembly can drive the rotating side of the swashplate.

Figure 1:
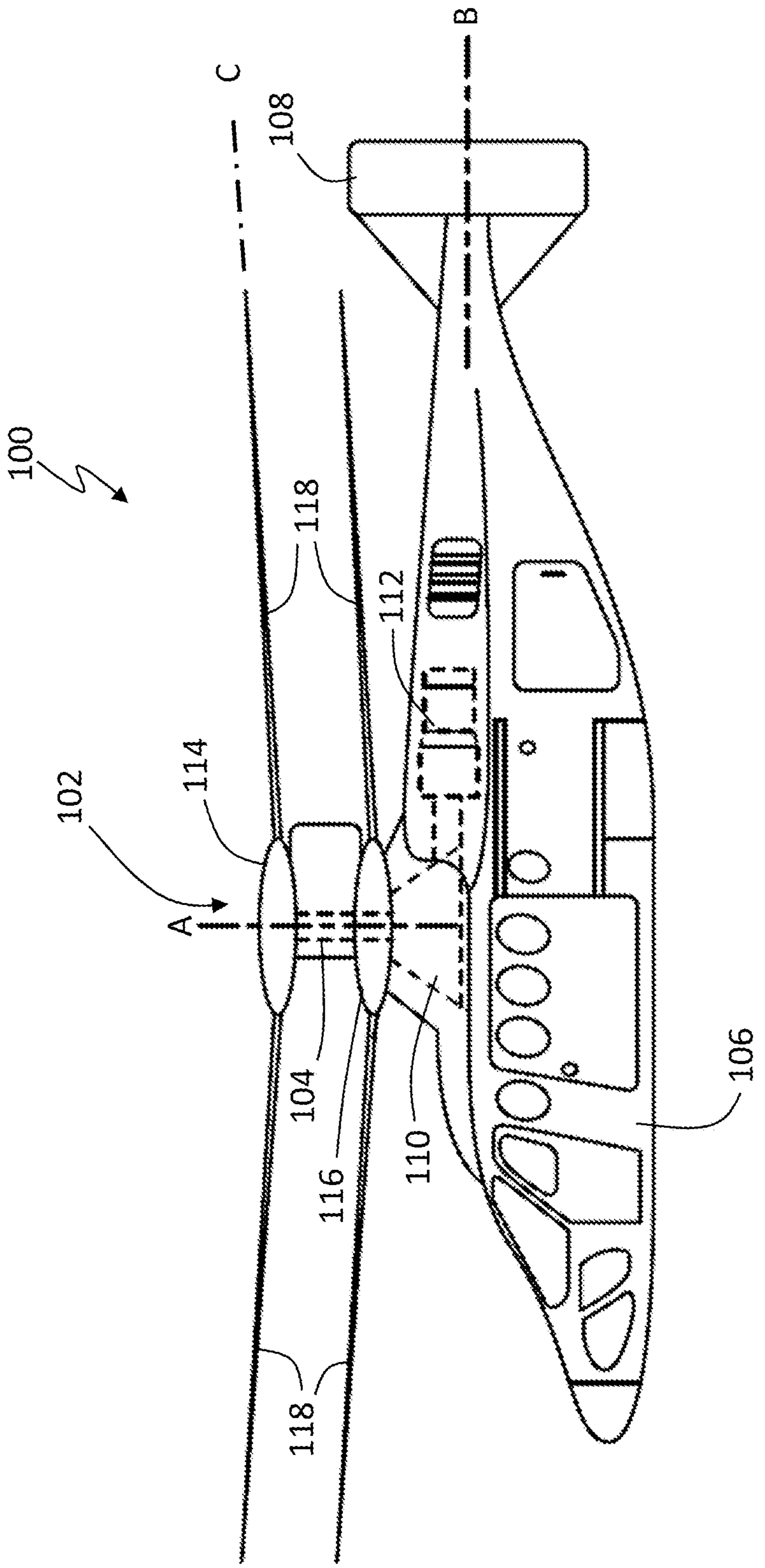
FIG. 1 is a perspective side view of an exemplary rotary-wing aircraft in accordance with embodiments.

FIG. 1 illustrates an exemplary vertical takeoff and landing ("VTOL") rotary-wing aircraft 100 having a rotor system 102, such as a dual, counter-rotating, coaxial rotor system. The rotor system 102 may rotate through a counter-rotating main rotor shaft 104 about an axis of rotation A. The aircraft 100 includes a fixed airframe 106, which supports the rotor system 102 as well as an optional translational thrust system 108, which provides translational thrust during high speed forward flight in a direction that is generally parallel to an aircraft longitudinal axis B. Although a particular rotor system aircraft configuration is illustrated in the disclosed embodiment of FIG. 1, other rotor systems and other aircraft types such as single rotor, tilt-wing and tilt-rotor aircraft, along with other application, may also benefit from embodiments of the present invention.

A main gearbox 110 may be driven by one or more engines or motors 112 and configured to drive the rotor system 102. The translational thrust system 108 may also be driven by the same main gearbox 110 which drives the rotor system 102. As shown, the main gearbox 110 may be interposed between the engines or motors 112, the rotor system 102, and the translational thrust system 108, although the precise location is not restricted thereto.

The rotor system 102 may include an upper rotor hub 114 and a lower rotor hub 116, as shown in FIG. 1, although embodiments of the invention may be employed with single rotor/hub systems. Each of the rotor hubs 114, 116 may include a plurality of rotor blade assemblies 118 mounted thereto for rotation about the rotor axis of rotation A. The rotor system 102, and the rotor hubs 114, 116, are mounted and configured to enable counter-rotation of the rotor hubs 114, 116.

The plurality of the rotor blade assemblies 118 project substantially radially outward from the rotor hubs 114, 116, and radially with respect to axis A. Any number of rotor blade assemblies 118 may be used with the rotor system 102. Each rotor blade assembly 118 of the rotor system 102 may include a rotor blade, a rotor blade spindle, and a rotor blade bearing, which supports the rotor blade spindle within a bearing housing to permit the rotor blade to pitch about a pitching axis C. It should be understood that various blade attachments may also be utilized with the present invention.

One or more rotor swashplate assemblies are configured to translate and/or tilt as operated by actuation mechanisms, such as control rods, servo actuators, etc., such that the swashplate may be controlled in both cyclic and collective pitch. Generally, translational motion of the swashplate assembly along the rotor axis A may cause the respective rotor blades 118 to vary in pitch collectively, while tilting of the swashplate assembly with respect to the rotor axis A may cause the respective rotor blades 118 to vary in pitch cyclically to ultimately tilt a rotor thrust vector. The swashplate assemblies may be in communication with a flight control system that receives pilot inputs from controls such as a collective stick, cyclic stick, foot pedals, and the like and/or via fly-by-wire technologies.

Figure 2A:
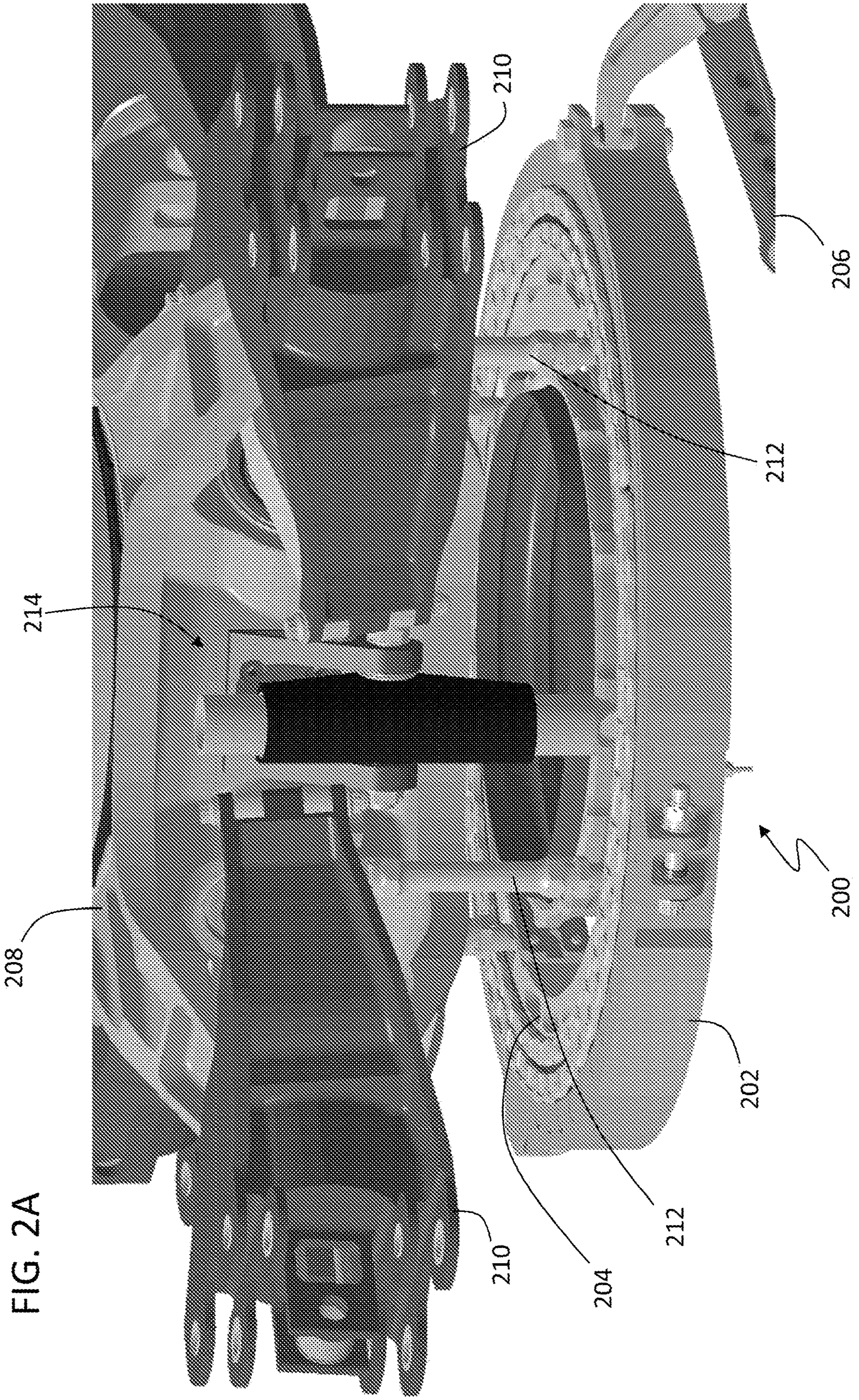
FIG. 2A is a perspective side view from a first angle of an exemplary swashplate assembly in accordance with an embodiment of the invention.
Figure 2B:
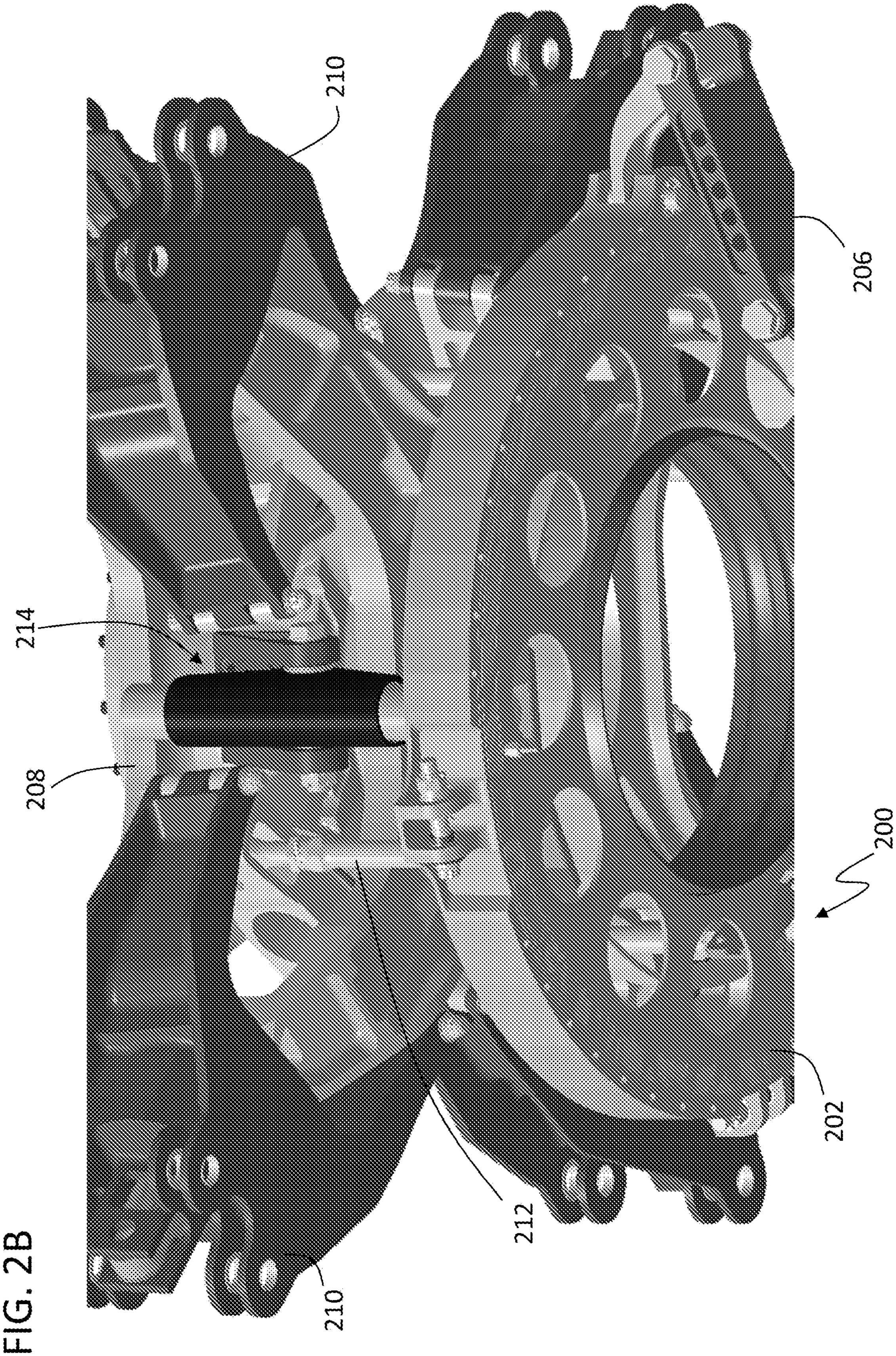
FIG. 2B is a perspective side view from a second angle of the swashplate assembly of FIG. 2A.

Turning now to FIGS. 2A and 2B, perspective views of a swashplate assembly 200 in accordance with an exemplary embodiment of the invention are shown. FIG. 2A shows a skewed top perspective view and FIG. 2B shows a skewed bottom perspective view.

Swashplate assembly 200 includes a stationary element 202 and a rotary element 204. The stationary element 202 may be connected to one or more scissor elements 206 that are indirectly manipulated by a pilot or other controller or control mechanism. As shown, there is only one scissor element 206 shown, but those of skill in the art will appreciate that any number of scissor elements 206 may be used.

Located in close proximity to the stationary element 202 of the swashplate assembly 200 is the rotary element 204, as shown in FIG. 2A. The rotary element 204 is configured to rotate with a rotor hub 208 and/or a rotor shaft (not shown). The rotor hub 208 is typically driven by a motor or engine of an aircraft, such as the engines or motors 112 shown in FIG. 1. Connected to the rotor hub 208 are one or more cuff assemblies 210, which are configured to support blades of the aircraft (not shown). The pitch of the blades is controlled by one or more pitch control rods 212. The pitch control rods 212 are operationally connected at a first end to the cuff assemblies 210 and at a second end the pitch control rods 212 are operationally connected to the rotary element 204 of the swashplate assembly 200.

Because the control rods 212 are at least indirectly connected to the rotor hub 208 and the swashplate rotary element 204, the control rods 212 could be used to impart the rotational movement to the rotary element 204, for example, by pulling the rotary element 204 along when the rotor hub 208 is rotated. However, such a configuration may create a dynamic instability within the system. As such, an independent assembly or system is typically used to provide the transfer of rotational motion from the rotor hub 208 to the rotary element 204. As shown in FIGS. 2A and 2B, a connector assembly 214 connects the rotor hub 208 and the rotary element 204 of the swashplate assembly 200.

The connector assembly 214 is connected at a first end to the rotor hub 208 and at a second end to the swashplate rotary element 204, similar to the control rods 212. Thus, when the rotor hub 208 rotates, the rotary element 204 may be rotated at the same rotational speed without creating dynamic instability in the control rods 212 or the swashplate assembly 200.

The scissor element 206 is configured to enable translation and/or tilting and thus collective pitch and cyclic pitch for flight operation. Collective pitch occurs when the entire stationary element 202 is raised or lowered by operation of one or more control links and/or servo actuators (not shown). Because the same adjustment is made to the rotary element 204, control intent is conveyed through the control rods 212 to each of the blades, creating a collective pitch change in the blades. Similarly, cyclic pitch occurs when only a portion, such as one side, of the stationary element 202 is raised or lowered, as is known in the art.

While not required in all aspects, the shown connector assembly 214 is configured to minimize the physical space occupied by the assembly while maintaining a sufficiently strong connection between the rotor hub 208 and the swashplate rotary element 204 such that dynamic instability is reduced or eliminated. The connector assembly 214 is configured to have some degree of movement or translation, such as a sliding movement of the connector assembly 214 or a portion thereof. The translation or degree of movement enables the connector assembly 214 to adjust with the pitch adjustments imparted to the swashplate assembly 200.

Figure 3C:
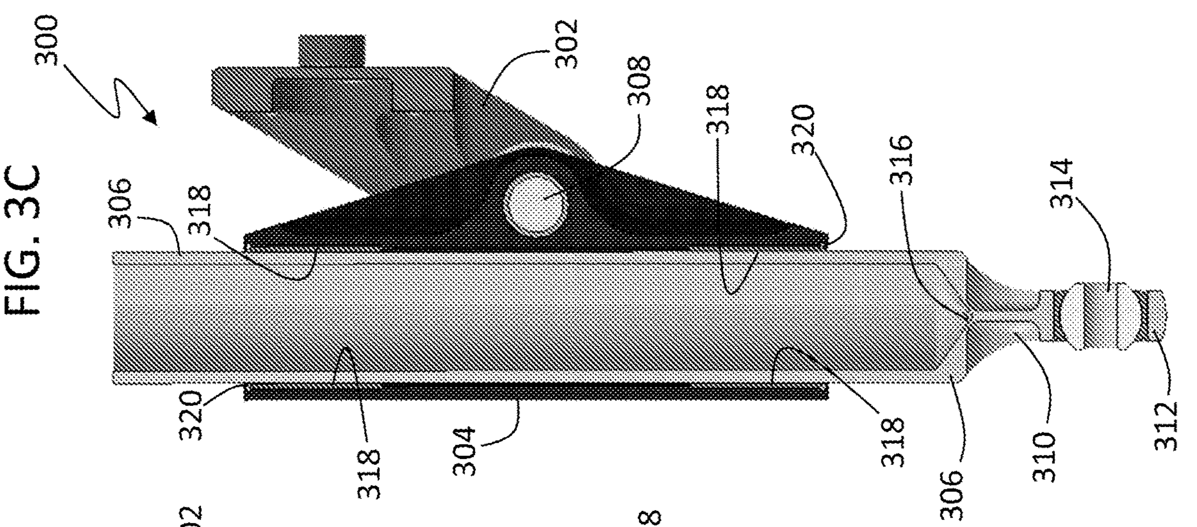
FIG. 3C is a cross-sectional view of the connector assembly of FIG. 3A.
Figure 3B:
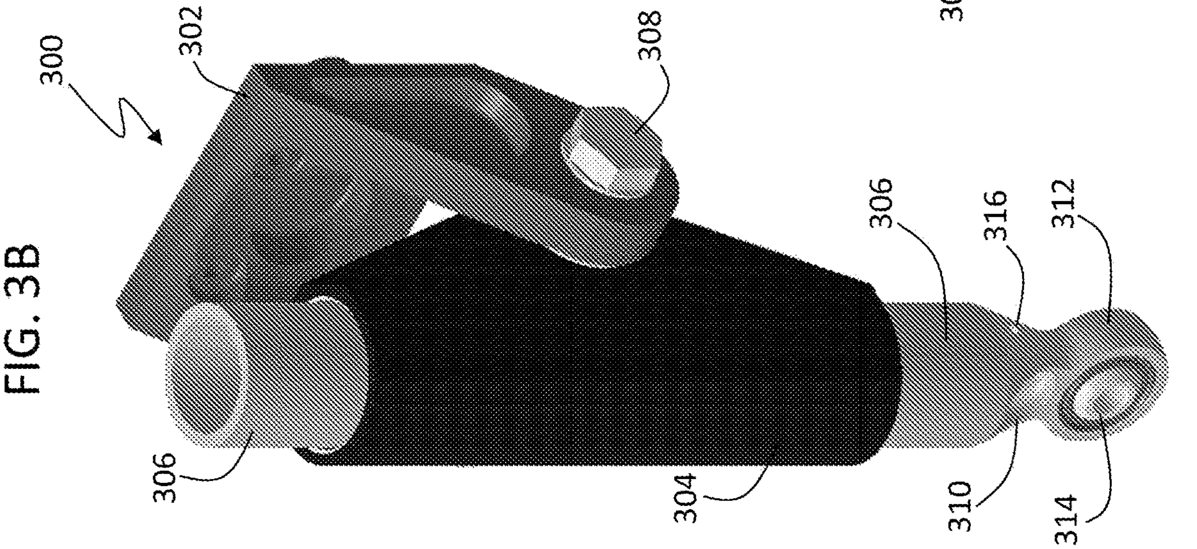
FIG. 3B is an alternative perspective view of the connector assembly of FIG. 3A.
Figure 3A:
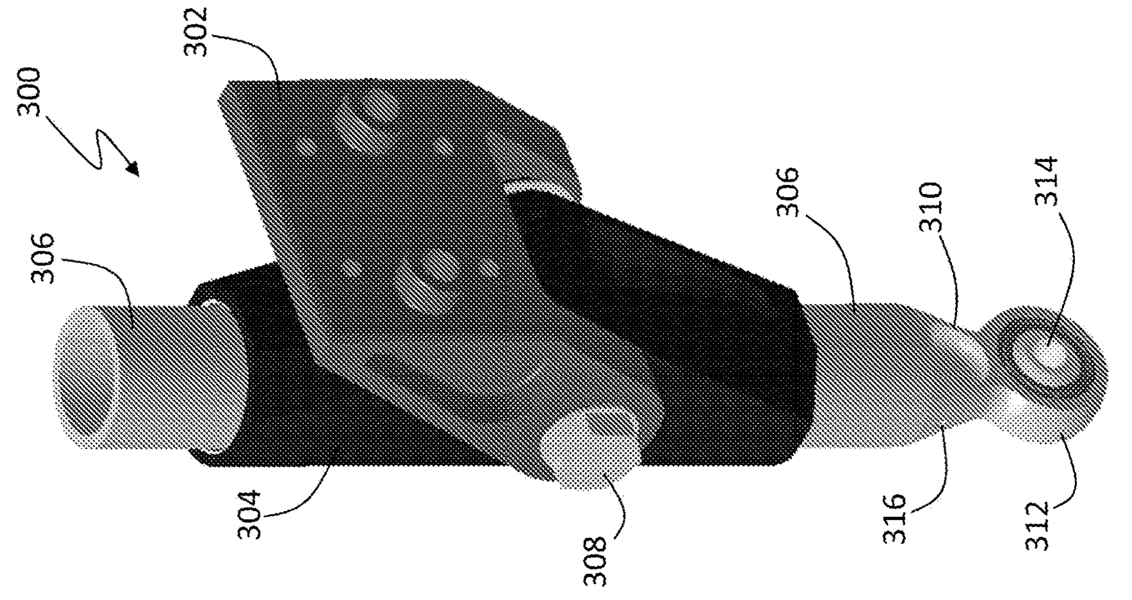
FIG. 3A is a perspective side view from a first angle of an exemplary connector assembly in accordance with an embodiment of the invention.

Turning now to FIGS. 3A-3C, views of a connector assembly 300 in accordance with an exemplary embodiment of the invention is shown. FIG. 3A is a first perspective view of the connector assembly 300; FIG. 3B is a second perspective view of the connector assembly 300; and FIG. 3C is a cross-sectional view of the connector assembly 300. It will be appreciated that the connector assembly 300 of FIGS. 3A-3C may be a configuration of the connector assembly 214 of FIGS. 2A and 2B. For example, the mount 302 may fixedly connect to the rotor hub 208 and the bearing 314 may fit within the swashplate rotary element 204. This connection enables the rotation of the rotor hub 208 to be conveyed to the rotary element 204 of the swashplate assembly 200 through the connector assembly 214/300.

In the embodiment of FIGS. 3A-3C, the connector assembly 300 of the invention includes a mount 302, a bracket or sleeve 304, and a translating element 306. As described below, the translating element 306 is configured to move relative to and within the sleeve 304 and the sleeve 304 is configured to pivot with respect to the mount 302. For example, the translating element 306 may slide within and relative to the sleeve 304.

The mount 302 is configured to fixedly attach to a rotor shaft or a rotor hub, such as rotor hub 208 of FIGS. 2A and 2B. The mount 302 may be attached or secured to the rotor hub by one or more fasteners, such as bolts, screws, adhesives, rivets, welding, etc. and/or combinations thereof. Because the mount 302 is fixedly attached or secured to the rotor hub, when the rotor hub rotates, so does the mount 302, and anything attached to the mount 302, such as the sleeve 304 and the translating element 306.

The mount 302 movably retains the sleeve 304 by means of a pivot 308. The pivot 308 may be a lock pin, bolt, etc., as known in the art. The pivot 308 enables the sleeve 304 to tilt or rotate with respect to the mount 302. The sleeve 304 may rotate about the pivot 308, but may not be able to translate or move in other orientations or about other axes.

Moveably retained within the sleeve 304 is the translating element 306. The translating element 306 is configured to engage with a rotary element of a swashplate assembly, thus operationally connecting the rotor hub (through the mount 302) to the rotary element of the swashplate assembly. One end of the translating element 306 is configured to operationally connect to a rotary element of a swashplate. As such, the translating element 306 includes a transition region 310, a bearing retainer 312, and a ball or bearing 314 rotatably retained within the bearing retainer 312. The bearing 314 is configured to mount and move within a rotary element of the swashplate, and the translating element 306 is configured to rotate or tilt with respect to the bearing 314.

As shown in FIGS. 3A-3C, the translating element 306 is hollow with an open top. This is merely exemplary and other configurations are possible, for example, including but not limited to solid structures or hollow structures with a capped top. In the hollow example shown, the translating element 306 includes a drain hole 316 at a bottom thereof. The drain hole 316 is configured to allow for fluids or small debris that may enter the translating element 306 to be drained away. The drain hole 316 is not required in all aspects and in various embodiments may be disposed in other locations.

With reference to FIG. 3C, the retention of the translating element 306 within the sleeve 304 is shown. Bearing cartridges 318 may be installed at the top and bottom of the sleeve 304 and configured such that the translating element 306 may be retained and moveable within the sleeve 304. The bearing cartridges 318 may fit within a tapered portion at the ends of the interior of the sleeve 304. The bearing cartridges 318 may also be press-fit to the interior of the sleeve 304. A ring clip 320 may also be installed at the ends of the bearing cartridges 318 to provide additional securing of the bearing cartridges 318 between the translating element 306 and the sleeve 304. As will be appreciated by those of skill in the art, other means of securing may be used such as a staking pin, nut, etc., without departing from the scope of the invention.

Figure 4:
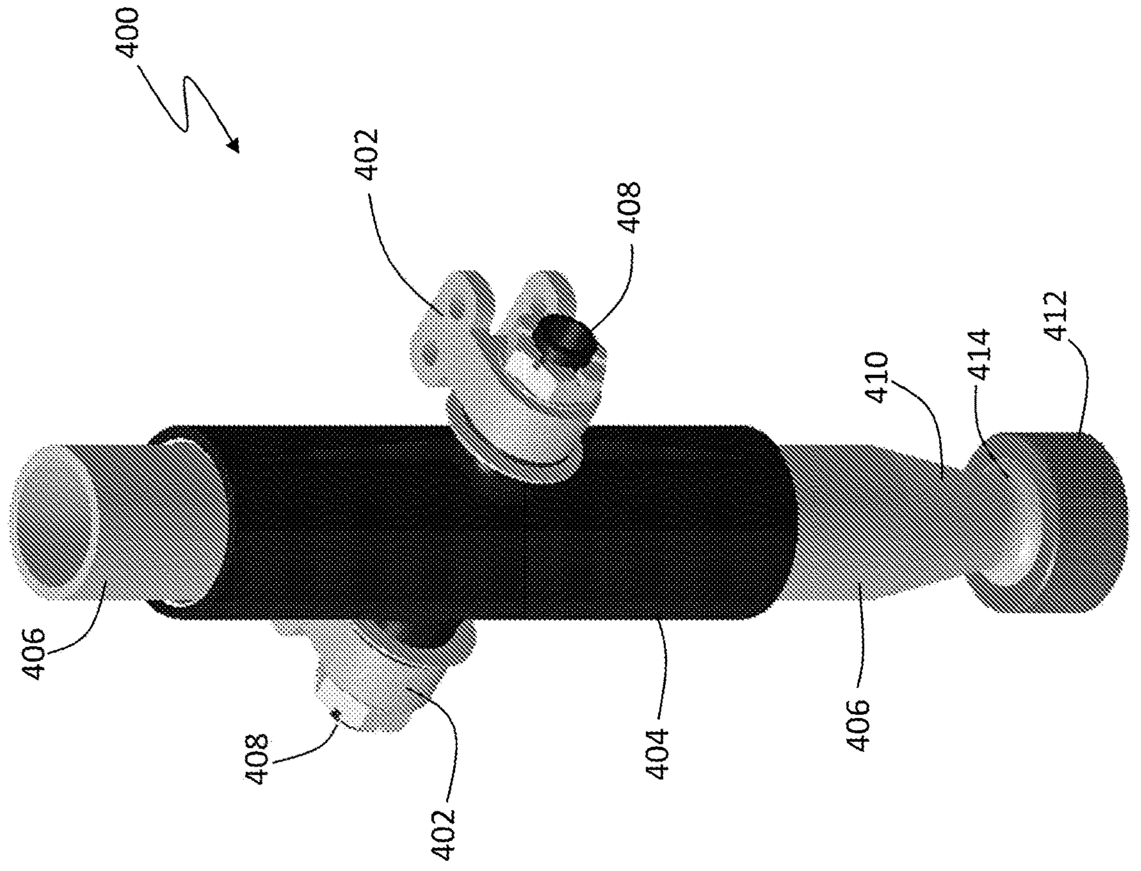
FIG. 4 is a perspective view of an alternative exemplary embodiment of a connector assembly in accordance with embodiments.

Turning now to FIG. 4, an alternative embodiment of a connector assembly in accordance with the invention is shown. Connector assembly 400 is similar to connector assembly 300 of FIGS. 3A-3C and thus like features are labeled with similar reference numbers, except preceded by a “4” rather than a “3.”

The connector assembly 400 includes a mount 402, which has a different configuration than that of mount 302 of connector assembly 300. The mount 402 is formed in two parts, with a first part connected on a first side of a sleeve 404 and a second part connected on a second side of the sleeve 404. The mounts 402 may fixedly connect to a rotor shaft or rotor hub, as described above. In the embodiment of FIG. 4, the mounts 402 are configured to retain a pivot 408. The pivot 408 of connector assembly 400 is configured as part of or integrally formed with the sleeve 404, rather than a bolt or other pivot device, though it is possible to utilize a separate pivot component.

A translating element 406 is configured to be movably retained within the sleeve 404 and have a similar construction to that described above with a transition region 410. At the end of the transition region 410 the construction of the bearing feature is different to that in connector assembly 300. For example, as will be appreciated by those of skill in the art, the transition region 410 has a spherical element 414 integrated therewith, fixedly attached thereto, etc. and a ball retainer 412 which is a bearing element having a shell or housing, and is configured to engage or sit within a pocket of the rotary element of the swashplate.

Advantageously, embodiments of the invention provide a new configuration of preventing dynamic instability by driving a rotary element of a swashplate assembly with a translating connector assembly. Advantageously, various embodiments and configurations of the invention prevent the translating element from poking through the bearing in the swashplate and thus interference issues with the swashplate stationary element (or other components on the stationary frame of reference) may be eliminated. Furthermore, as will be appreciated by those of skill in the art, the location and configuration of the translating element and connector assembly may improve the physical real estate available for reacting scissoring moments, which may help control sizing and other packaging issues in and around the rotor head and swashplate assemblies.

Furthermore, various embodiments of the invention may provide weight savings in the swashplate assembly as a whole due to the elimination of one or more of the pivot joints commonly seen in standard scissor assemblies such as scissor element 206 in FIGS. 2A and 2B. Moreover, maintenance may be improved and/or easily managed and executed with use of various embodiments of the invention.

Advantageously, various embodiments of the invention may enable longer bearing lives due to less aggressive wear rates on the various elements of the swashplate assemblies. Additionally, bearing elements may be reused, thus extending part life and reducing maintenance costs. For example, embodiments of the invention may enable a bearing to be rotated about its axis when the bearing becomes worn on one side, which may improve the life of the entire structure. In addition, various embodiments of the invention may be less prone to damage and ballistic degradation over standard designs.

While the invention has been described in detail in connection with only a limited number of embodiments, it should be readily understood that the invention is not limited to such disclosed embodiments. Rather, the invention can be modified to incorporate any number of variations, alterations, substitutions, combinations, sub-combinations, or equivalent arrangements not heretofore described, but which are commensurate with the spirit and scope of the invention. Additionally, while various embodiments of the invention have been described, it is to be understood that aspects of the invention may include only some of the described embodiments.

For example, as noted, although described and shown with respect to a rotary-wing aircraft, the connector assemblies described herein may be employed in various other applications including aerospace, automotive, downhole/drill applications, engines/turbines, etc. Furthermore, although described with respect to a dual rotor aircraft, as noted, those of skill in the art will appreciate that embodiments of the invention may be employed on single rotor aircraft.

Furthermore, although various pivots, bearings, and other structural features are described and shown, the invention is not limited thereto. For example, the pivot may be a pin-and-slot configuration, rather than a bolt and/or may be integral with the sleeve. The bearing configuration that joins with the rotary element of the swashplate may also have other designs and/or configurations.

Additionally, the translating element described herein is not required to be cylindrical, as shown. The translating components described herein are merely presented for explanatory purposes, and those of skill in the art will appreciate that other geometries may be used without departing from the scope of the invention.

Accordingly, the invention is not to be seen as limited by the foregoing description, but is only limited by the scope of the appended claims.

What is claimed is:

1. A connector assembly to connect a swashplate and a rotor shaft or hub, the connector assembly comprising:
- a mount configured to fixedly connect to the rotor shaft or hub;
- a sleeve having a first orifice at a first end and a second orifice at a second end, and pivotably attached to the mount;
- a translating element translationally retained within the sleeve and configured to engage with the swashplate such that the swashplate and the rotor shaft or hub rotate at the same rotational speed;
- a first bearing cartridge arranged radially inward from the first end the sleeve; and
- a second bearing cartridge arranged radially inward from the second end the sleeve,
- wherein each bearing cartridge is configured such that the translating element is retained and moveable within the sleeve.

2. The connector assembly of claim 1, further comprising a pivot to pivotably attach the sleeve to the mount.

3. The connector assembly of claim 2, wherein the pivot is integrally formed with the sleeve.

4. The connector assembly of claim 1, wherein the translating element includes a bearing interface configured to rotationally engage with the swashplate.

5. The connector assembly of claim 1, wherein the mount is configured to be driven at the rotational speed by the rotor shaft or hub, and wherein the translating element is configured to drive the rotary element of the swashplate at the rotational speed.

6. The connector assembly of claim 1, wherein the mount comprises at least two components.

7. The connector assembly of claim 1, wherein the rotor shaft or hub is a component within a rotary-wing aircraft.

8. A swashplate assembly for use with a rotor shaft or hub, the assembly comprising: a rotary element;

a stationary element operationally connected to the rotary element; and a connector assembly configured to operationally connect the rotary element to the rotor shaft or hub, wherein the connector assembly comprises:

a mount configured to fixedly connect to the rotor shaft or hub; a sleeve having a first orifice at a first end and a second orifice at a second end, and pivotably attached to the mount; and a translating element translationally retained within the sleeve and configured to engage with the rotary element such that the rotary element and the rotor shaft or hub rotate at the same rotational speed;

a first bearing cartridge arranged radially inward from the first end the sleeve; and a second bearing cartridge arranged radially inward from the second end the sleeve, wherein each bearing cartridge is configured such that the translating element is retained and moveable within the sleeve.

9. The swashplate assembly of claim 8, further comprising a pivot to pivotably attach the sleeve to the mount.

10. The swashplate assembly of claim 9, wherein the pivot is integrally formed with the sleeve.

11. The swashplate assembly of claim 8, wherein the translating element includes a bearing interface configured to rotationally engage with the rotary element.

12. The swashplate assembly of claim 8, wherein the mount is configured to be driven at the rotational speed by the rotor shaft or hub, and wherein the translating element is configured to drive the rotary element at the rotational speed.

13. The swashplate assembly of claim 8, wherein the mount comprises at least two components.

14. The swashplate assembly of claim 8, wherein the rotor shaft or hub is a component within a rotary-wing aircraft.

15. The swashplate assembly of claim 8, further comprising one or more control rods connected to the rotary element and configured to adjust a pitch of a blade.

16. The connector assembly of claim 1, wherein the translating element is arranged to extend through the first orifice and the second orifice.

17. The swashplate assembly of claim 8, wherein the translating element is arranged to extend through the first orifice and the second orifice.

* * * * *